US010958625B1

(12) United States Patent
Thornewell et al.

(10) Patent No.: US 10,958,625 B1
(45) Date of Patent: Mar. 23, 2021

(54) METHODS FOR SECURE ACCESS TO SERVICES BEHIND A FIREWALL AND DEVICES THEREOF

(71) Applicant: F5 Networks, Inc., Seattle, WA (US)

(72) Inventors: Peter M. Thornewell, Seattle, WA (US); David D. Schmitt, Seattle, WA (US); Alan Mimms, Seattle, WA (US); Saxon Amdahl, San Jose, CA (US); Bill Baumann, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 203 days.

(21) Appl. No.: 16/294,822

(22) Filed: Mar. 6, 2019

Related U.S. Application Data

(60) Provisional application No. 62/639,461, filed on Mar. 6, 2018.

(51) Int. Cl.
*H04L 29/06* (2006.01)
*H04L 29/08* (2006.01)

(52) U.S. Cl.
CPC .......... *H04L 63/029* (2013.01); *H04L 67/141* (2013.01); *H04L 67/02* (2013.01); *H04L 67/42* (2013.01)

(58) Field of Classification Search
CPC ..... H04L 63/029; H04L 67/141; H04L 67/02; H04L 67/42
See application file for complete search history.

(56) References Cited

U.S. PATENT DOCUMENTS

| 9,531,801 B1* | 12/2016 | Cantrell | H04L 41/5041 |
| 2006/0053485 A1* | 3/2006 | Li | H04L 69/163 726/11 |
| 2006/0104288 A1* | 5/2006 | Yim | H04L 69/16 370/395.52 |
| 2007/0255861 A1* | 11/2007 | Kain | H04L 63/029 710/8 |

(Continued)

OTHER PUBLICATIONS

F5 Networks, Inc., "F5 BIG-IP Advanced Firewall Manager Operations Guide", Manual, Dec. 2018, 60 pages, F5 Networks, Inc., Retrieved from the Internet:<https://support.f5.com/kb/en-us/products/big-ip-afm/manuals/product/f5-afm-operations-guide.html>.

(Continued)

*Primary Examiner* — Arvin Eskandarnia
(74) *Attorney, Agent, or Firm* — Troutman Pepper Hamilton Sanders LLP

(57) ABSTRACT

Methods, non-transitory computer readable media, rendezvous gateway (RG) apparatuses, and network security systems that send an RG synchronization message (SYN) to an application in a secure domain following receipt, from a client, of a client SYN comprising an indication of the application. A rendezvous agent (RA) SYN is received, via a firewall coupled to the security domain and in response to the RG SYN, from an RA in the secure domain. A first RG synchronization-acknowledgement message (SYN+ACK) is sent to the client in response to the client SYN. A second RG SYN+ACK is sent, via the firewall, to the RA in response to the RA SYN. The RA is notified of receipt of a client acknowledgement message (ACK) from the client. An RA ACK is received, from the RA and via the firewall, in response to the notification, to thereby establish a full connection between the client and the application.

20 Claims, 9 Drawing Sheets

(56) References Cited

U.S. PATENT DOCUMENTS

| | | | | |
|---|---|---|---|---|
| 2008/0028097 | A1* | 1/2008 | Makela | H04L 63/029 709/237 |
| 2010/0161741 | A1* | 6/2010 | Jiang | H04L 67/42 709/206 |
| 2012/0166656 | A1* | 6/2012 | Asveren | H04L 65/1076 709/228 |
| 2018/0041470 | A1* | 2/2018 | Schultz | H04L 47/24 |

OTHER PUBLICATIONS

F5 Networks, Inc., "BIG-IP® Local Traffic Management: Basics", Manual, Jan. 18, 2019, 122 pages, version 13.0, F5 Networks, Inc., Retrieved from the Internet:<https://support.f5.com/kb/en-us/products/big-ip_ltm/manuals/product/ltm-basics-13-0-0.html>.

F5 Networks, Inc., "F5 BIG-IP TMOS: Operations Guide", Manual, Dec. 2018, 226 pages, F5 Networks, Inc., Retrieved from the Internet:<https://support.f5.com/kb/en-us/products/big-ip_ltm/manuals/product/f5-tmos-operations-guide.html>.

F5 Networks, Inc., "BIG-IP® Network Firewall: Policies and Implementations", Manual, Feb. 5, 2019, 206 pages, version 13.1, F5 Networks, Inc., Retrieved from the Internet:<https://support.f5.com/kb/en-us/products/big-ip-afm/manuals/product/network-firewall-policies-implementations-13-1-0.html>.

F5 Networks, Inc., "BIG-IP® Local Traffic Manager™: Implementations", Manual, Aug. 13, 2018, 180 pages, version 13.1, F5 Networks, Inc., Retrieved from the Internet:<https://support.f5.com/kb/en-us/products/big-ip_ltm/manuals/product/ltm-implementations-13-1-0.html>.

F5 Networks, Inc., "BIG-IP® TMOS®: Implementations", Manual, Mar. 2, 2017, 72 pages, version 13.0, F5 Networks, Inc., Retrieved from the Internet:<https://support.f5.com/kb/en-us/products/big-ip_ltm/manuals/product/tmos-implementations-13-0-0.html>.

* cited by examiner

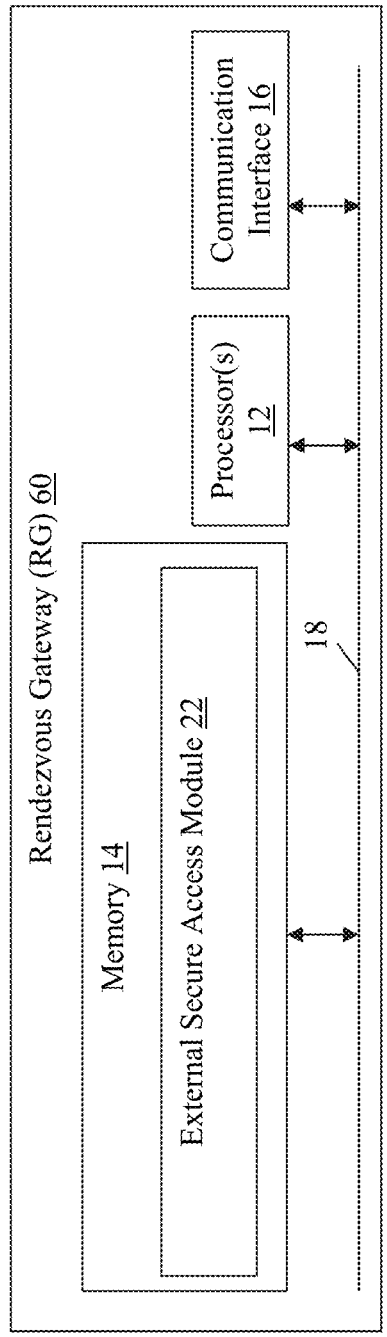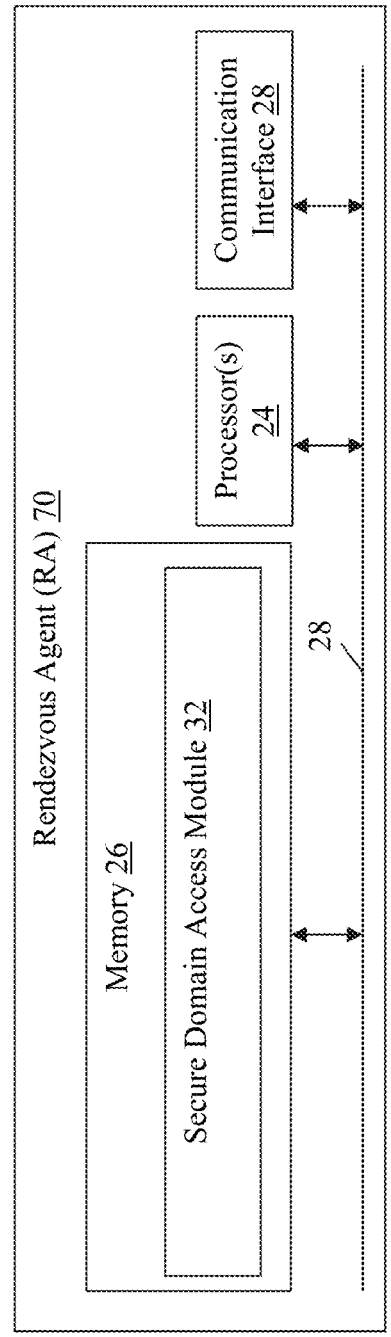
FIG. 2
FIG. 3

METHODS FOR SECURE ACCESS TO SERVICES BEHIND A FIREWALL AND DEVICES THEREOF

This application claims the benefit of U.S. Provisional Patent Application Ser. No. 62/639,461, filed Mar. 6, 2018, which is hereby incorporated by reference in its entirety.

FIELD

This technology generally relates to network security and, more particularly, to methods and devices for facilitating secure access to services behind a firewall.

BACKGROUND

Providing external users with access to services, such as cloud infrastructure and other Internet services that are located within or behind a firewall is a task that is difficult to both manage and maintain. To allow such secure access, applications, e.g., mobile applications, must create a separate external infrastructure to which a given application program must connect and poll for outside work requests or other requests. Such arrangements are inefficient, often unsecure, and require separate external infrastructure that must be maintained by the application provider.

In one particular example, an external client can use a "special" tunnel that is "punched through" a firewall for connecting to services. The services can be Internet-of-Things (IoT) services and/or the connection can be via a virtual private network (VPN), for example. The special tunnel is not sufficiently restrictive in relation to providing external client access.

As such, the special tunnel inadvertently provides a gateway from an unsecure external client, into a "secure" domain, e.g., having the IoT services, thereby rendering the secure domain vulnerable to malware or hacking. To use the firewall, an external client must be able to support the tunnel protocol of the special tunnel or have special tunneling software for the special tunnel. The special tunnel must be configured in the firewall that is protecting the secure domain. However, this requirement also increases the attackable "surface" of the firewall.

SUMMARY

A method for secure access to services behind a firewall implemented in cooperation with a network security system including one or more rendezvous gateway (RG) modules, rendezvous agent (RA) modules, firewall modules, host modules, or client modules, includes sending an RG synchronization message (SYN) to an application in a secure domain following receipt, from a client, of a client SYN comprising an indication of the application. A rendezvous agent (RA) SYN is received, via a firewall coupled to the security domain and in response to the RG SYN, from an RA in the secure domain. A first RG synchronization-acknowledgement message (SYN+ACK) is sent to the client in response to the client SYN. A second RG SYN+ACK is sent, via the firewall, to the RA in response to the RA SYN. The RA is notified of receipt of a client acknowledgement message (ACK) from the client. An RA ACK is received, from the RA and via the firewall, in response to the notification, to thereby establish a full connection between the client and the application.

An RG apparatus includes memory including programmed instructions stored thereon and one or more processors configured to be capable of executing the stored programmed instructions to send an RG SYN to an application in a secure domain following receipt, from a client, of a client SYN comprising an indication of the application. An RA SYN is received, via a firewall coupled to the security domain and in response to the RG SYN, from an RA in the secure domain. A first RG SYN+ACK is sent to the client in response to the client SYN. A second RG SYN+ACK is sent, via the firewall, to the RA in response to the RA SYN. The RA is notified of receipt of a client ACK from the client. An RA ACK is received, from the RA and via the firewall, in response to the notification, to thereby establish a full connection between the client and the application.

A non-transitory computer readable medium having stored thereon instructions for secure access to services behind a firewall including executable code that, when executed by one or more processors, causes the processors to send an RG SYN to an application in a secure domain following receipt, from a client, of a client SYN comprising an indication of the application. An RA SYN is received, via a firewall coupled to the security domain and in response to the RG SYN, from an RA in the secure domain. A first RG SYN+ACK is sent to the client in response to the client SYN. A second RG SYN+ACK is sent, via the firewall, to the RA in response to the RA SYN. The RA is notified of receipt of a client ACK from the client. An RA ACK is received, from the RA and via the firewall, in response to the notification, to thereby establish a full connection between the client and the application.

A network security system includes one or more RG modules, RA modules, firewall modules, host modules, or client modules, memory comprising programmed instructions stored thereon, and one or more processors configured to be capable of executing the stored programmed instructions to send an RG SYN to an application in a secure domain following receipt, from a client, of a client SYN comprising an indication of the application. An RA SYN is received, via a firewall coupled to the security domain and in response to the RG SYN, from an RA in the secure domain. A first RG SYN+ACK is sent to the client in response to the client SYN. A second RG SYN+ACK is sent, via the firewall, to the RA in response to the RA SYN. The RA is notified of receipt of a client ACK from the client. An RA ACK is received, from the RA and via the firewall, in response to the notification, to thereby establish a full connection between the client and the application.

This technology has a number of associated advantages including providing methods, non-transitory computer readable media, RG apparatuses, and network security systems that provide secure techniques for clients outside a firewall to access services provided by systems, apparatuses, and devices inside the firewall. In particular, this technology authenticates users outside a firewall for providing access to services in a security domain inside the firewall. This technology facilitates scaling and enhancing firewalls and can be used to improve security and access for Internet-of-Things (IoT) deployments, for example.

BRIEF DESCRIPTION OF THE DRAWINGS

FIG. 2 is a block diagram of an exemplary RG;

FIG. 3 is a block diagram of an exemplary RA;

DETAILED DESCRIPTION

Figure 1:
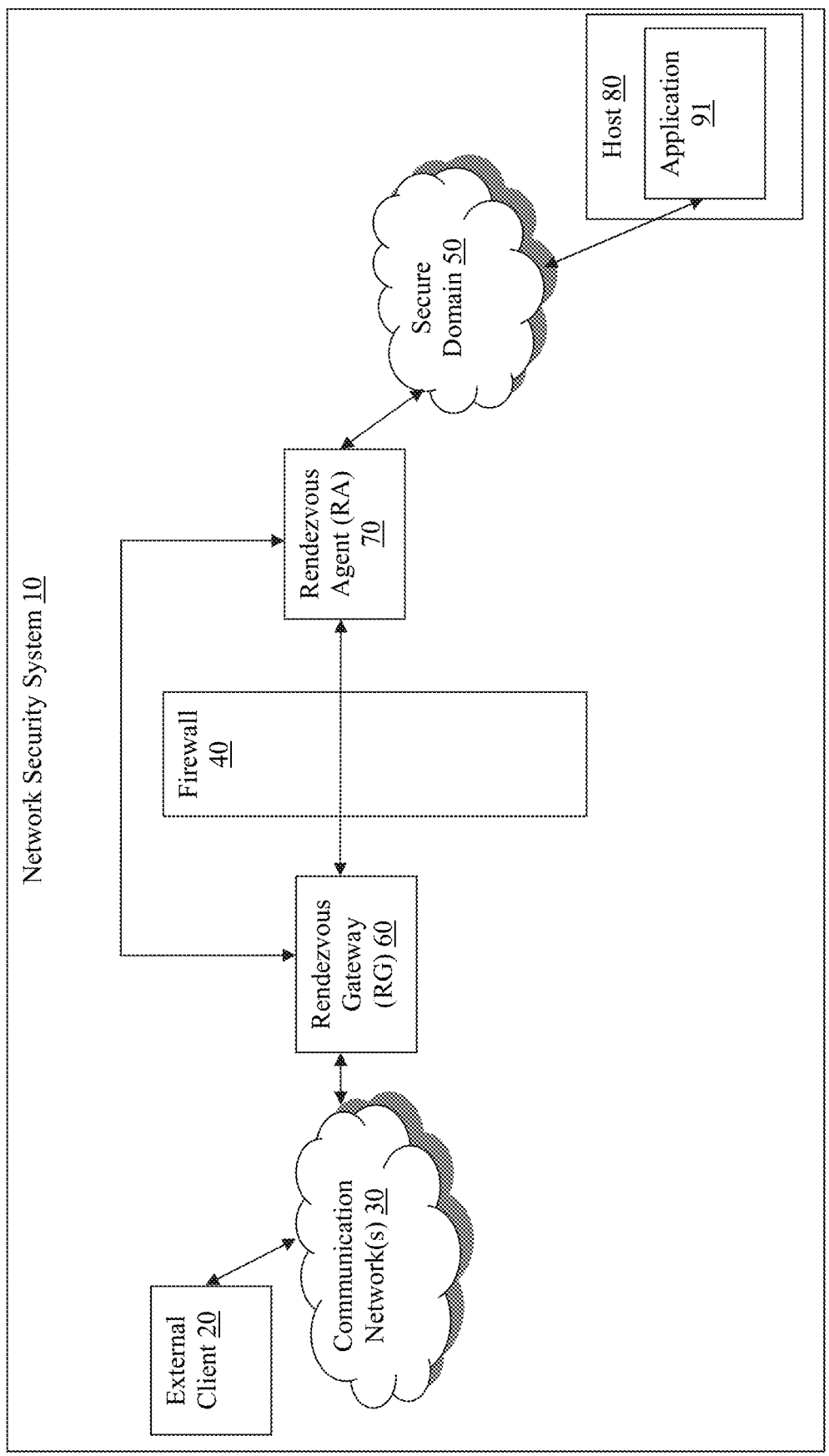
FIG. 1 is a block diagram of an exemplary network security system with a rendezvous gateway (RG) and a rendezvous agent (RA)

Referring to FIG. 1, an exemplary network environment that incorporates an exemplary network security system 10 is illustrated. The network security system 10 in this example includes a rendezvous gateway 60 that is coupled to an external client 20, via communication network(s) 30, and a rendezvous agent (RA), via a firewall 40. The RA 70 is coupled to an application 91 on a host 80 via a secure domain or network(s) 50. In other examples, the external client 20, RG 60, firewall 40, RA 70, and host 80 may be coupled together via other topologies. The network security system 10 may include other network devices such as one or more routers or switches, for example, which are known in the art and thus will not be described herein. This technology provides a number of advantages including methods, non-transitory computer readable media, network security systems, and RGs that facilitate improved, secure access for clients outside a firewall to services provided by resources inside the firewall.

In this particular example, the external client 20, RG 60, firewall 40, RA 70, and host 80 are disclosed in FIG. 1 as dedicated hardware devices. However, one or more of the external client 20, RG 60, firewall 40, RA 70, or host 80 can also be implemented in software within one or more other devices in the network security system 10. As used herein, the term "module" refers to either an implementation as a dedicated hardware device or apparatus, or an implementation in software hosted by another hardware device or apparatus that may be hosting one or more other software components or implementations.

As one example, the RA 70, as well as any of its components or applications, can be a module implemented as software executing on the host 80, and many other permutations and types of implementations can also be used in other examples. Moreover, any or all of the external client 20, RG 60, firewall 40, RA 70, or host 80 can be implemented, and may be referred to herein, as a module.

Referring to FIGS. 1-2, the RG 60 of the network security system 10 may perform any number of functions, including providing network security, load balancing network traffic, or accelerating network traffic associated with applications, for example. The RG 60 in this example includes one or more processor(s) 12, a memory 14, and a communication interface 16, which are coupled together by a bus 18, although the RG 60 can include other types or numbers of elements in other configurations.

The processor(s) 12 of the RG 60 may execute programmed instructions stored in the memory 14 of the RG 60 for any number of the functions identified above. The processor(s) 12 may include one or more central processing units (CPUs) or general purpose processors with one or more processing cores, for example, although other types of processor(s) can also be used.

The memory 14 of the RG 60 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 12, can be used for the memory 14.

Accordingly, the memory 14 of the RG 60 can store one or more applications that can include computer executable instructions that, when executed by the RG 60, cause the RG 60 to perform actions, such as to transmit, receive, or otherwise process messages, for example, and to perform other actions described and illustrated below with reference to FIGS. 4-15. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the RG 60 itself, may be located in virtual server(s) running in a cloud-based computing environment rather than being tied to one or more specific physical network computing devices. Also, the application(s) may be running in one or more virtual machines (VMs) executing on the RG 60. Additionally, in one or more examples of this technology, virtual machine(s) running on the RG 60 may be managed or supervised by a hypervisor.

In this particular example, the memory 14 of the RG 60 includes an external secure access module 22. The external secure access module 22 is configured to register the RA 70 and provide secure access for the external client 20 to the application 91 in the secure domain 50. In particular, the external secure access module 22 receives an initial synchronization message (SYN) (e.g., in the form of a hypertext transfer protocol secure (HTTPS) request according to the transmission control protocol (TCP)) from the external client 20 via the communication network(s) 30. The SYN from the external client 20 identifies the application 91.

In response, the external secure access module 22 notifies the RA of the client SYN, which initiates a connection with the RG 60 through the firewall 40 and outside of the secure domain 50. The external secure access module 22 proceeds to complete a TCP handshake with the RA from the perspective of the firewall 40, as well as with the external client 20 over the communication network(s) 30. The RA 70 also completes a TCP handshake with the application 91, as described and illustrated in more detail later, to thereby facilitate a secure connection between the external client 20 and the application 91.

Referring back to FIGS. 1-2, the communication interface 16 of the RG 60 operatively couples and communicates between the RG 60, external client 20, and RA 70, which are coupled together at least in part by the communication network(s) 30, although other types or numbers of communication networks or systems with other types or numbers of connections or configurations to other devices or elements can also be used.

By way of example only, the communication network(s) 30 can include local area network(s) (LAN(s)) or wide area network(s) (WAN(s)), and can use TCP/IP over Ethernet and industry-standard protocols, although other types or numbers of protocols or communication networks can be used. The communication network(s) 30 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the RG 60 is illustrated in this example as including a single device, the RG 60 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the RG 60. Additionally, one or more of the devices that together comprise the RG 60 in other examples can be standalone devices or integrated with one or more other devices or apparatuses.

Referring to FIGS. 1 and 3, the RA 70 of the network security system 10 may perform any number of functions, including load balancing, providing network security, or accelerating network traffic, for example. The RA 70 in this example includes one or more processor(s) 24, a memory 26, and a communication interface 28, which are coupled together by a bus 28, although the RA 70 can include other types or numbers of elements in other configurations.

The processor(s) 24 of the RA 70 may execute programmed instructions stored in the memory 26 of the RA 70 for any number of the functions identified above. The processor(s) 24 may include one or more central processing units (CPUs) or general purpose processors with one or more processing cores, for example, although other types of processor(s) can also be used.

The memory 26 of the RA 70 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s) 24, can be used for the memory 26.

Accordingly, the memory 26 of the RA 70 can store one or more applications that can include computer executable instructions that, when executed by the RA 70, cause the RA 70 to perform actions, such as to transmit, receive, or otherwise process messages, for example, and to perform other actions described and illustrated below with reference to FIGS. 4-15. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the RA 70 itself, may be located in virtual server(s) running in a cloud-based computing environment rather than being tied to one or more specific physical network computing devices. Also, the application(s) may be running in one or more VMs executing on the RA 70. Additionally, in one or more examples of this technology, virtual machine(s) running on the RA 70 may be managed or supervised by a hypervisor.

In this particular example, the memory 26 of the RA 70 includes a secure domain access module 32. The secure domain access module 32 is configured to securely connect and authenticate itself with the RG 60, thereby establishing a trusted control connection for subsequent rendezvous connection activity. Once this control connection is established, the external client 20 can use the RG 60 to establish connections with the application 91 inside the firewalled or secure domain 50.

In particular, the secure domain access module 32 facilitates the connection by receiving notification from the RG 60 that the external client 20 has initiated a SYN identifying the application 91. The secure domain access module 32 subsequently initiates and establishes a TCP connection with the RG 60 and the application 91, and completed TCP handshakes with the RG 60 and application 91, as described and illustrated in more detail later.

Referring back to FIGS. 1 and 3, the communication interface 28 of the RA 70 operatively couples and communicates between the RA 70, RG 60, and application 91 hosted by the host 80, which are coupled together at least in part by the secure domain 50 and communication network(s) between the RA 70 and RG 60 (not shown), although other types or numbers of communication networks or systems with other types or numbers of connections or configurations to other devices or elements can also be used.

By way of example only, the secure domain 50 can include LAN(s) and can use TCP/IP over Ethernet and industry-standard protocols, although other types or numbers of protocols or communication networks can be used. The secure domain 50 in this example can employ any suitable interface mechanisms and network communication technologies including, for example, teletraffic in any suitable form (e.g., voice, modem, and the like), PSTNs, Ethernet-based PDNs, combinations thereof, and the like.

Behind the firewall 40, the secure domain 50, such as a private home or a data center having a protected set of servers or other host devices (e.g., host 80), is configured to permit only outgoing network connections. Computing applications, application programs, or software applications running within the secure domain 50 are advantageously made capable of providing secure access to firewalled services to the user of the external client 20 outside the firewalled secure domain 50 by way of the technology described and illustrated herein.

While the RA 70 is illustrated in this example as including a single device, the RA 70 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the RA 70. Additionally, one or more of the devices that together comprise the RA 70 in other examples can be standalone devices or integrated with one or more other devices or apparatuses.

Even further, the functionality of the RA 70 is configurable as a separate service, a device (e.g., host 80), and an integrated service in the application 91. In some examples, the integration is directly performable, e.g., by configuring the application 91 with a functionality for handling the functions of the RA 70, or "invisibly" performable, e.g., by wrapping the network socket APIs of the application 91 with code that handles the functions of the RA 70 for appropriate socket operations, such as socket operations that allow the code of the application 91 to directly perform a functionality of the RA 70.

The external client 20 of the network security system 10 in this example includes any type of computing device that can exchange network data, such as mobile, desktop, laptop, or tablet computing devices, virtual machines (including cloud-based computers), or the like. The external client 20 in this example includes a processor, a memory, and a communication interface, which are coupled together by a bus or other communication link (not illustrated), although other numbers or types of components could also be used.

The external client 20 may run interface applications, such as standard web browsers or standalone client applications, which may provide an interface to make requests for, and receive content stored on, the host 80 (e.g., the application 91) via the communication network(s) 30. The external client 20 may further include a display device, such as a display screen or touchscreen, or an input device, such as a keyboard for example (not illustrated).

The firewall 40 of the network security system 10 in this example monitors and controls incoming and outgoing network traffic based on predetermined security rules or a stored security policy. In this example, the firewall 40 allows only outgoing connections from the secure domain 50 (e.g., as initiated by the RA 70 as described and illustrated in more detail later). The firewall 40 in this example includes a processor, a memory, and a communication interface, which are coupled together by a bus or other communication link (not illustrated), although other numbers or types of components could also be used.

The host 80 of the network traffic management system 10 in this example includes processor(s), a memory, and a communication interface, which are coupled together by a bus or other communication link, although other numbers or types of components could be used. The host 80 in this example can include an application server or IoT device, for example, that hosts application(s) including application 91 to which the external client 20 is attempting to communicate, although other types of host devices can also be used.

Accordingly, the application 91 may be operating on the host 80 and may be configured to transmit data (e.g., files or web pages) toward the external client 20 (e.g., via the secure domain 50 and RA 70. The host 80 may be hardware or software or may represent a system with multiple servers in a pool, which may include internal or external networks.

Although the host 80 is illustrated as a single device, one or more actions of the host 80 may be distributed across one or more distinct network computing devices that together comprise the host 80. Moreover, the host 80 is not limited to a particular configuration. Thus, the host 80 may contain network computing devices that operate using a master/slave approach, whereby one of the network computing devices of the host 80 operate to manage or otherwise coordinate operations of the other network computing devices. The host 80 may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, the host 80 can operate within the RA 70 itself rather than as a stand-alone server device communicating with the RA 70 via secure domain 50. In this example, the host 80 operates within the memory 26 of the RA 70.

Although the exemplary network security system 10 with the external client 20, RG 60, firewall 40, RA 70, host 80, communication network(s) 30, and secure domain 50 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the external client 20, RG 60, firewall 40, RA 70, or host 80, for example, may be configured to operate as virtual instances on the same physical machine. In other words, one or more of the external client 20, RG 60, firewall 40, RA 70, or host 80 may operate on the same physical device rather than as separate devices communicating through communication network(s) 30 or secure domain 50. Additionally, there may be more or fewer external clients, RGs, firewalls, RAs, or hosts than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, PDNs, the Internet, intranets, and combinations thereof.

The examples may also be embodied as one or more non-transitory computer readable media having instructions stored thereon, such as in the memory 22 or 26, for one or more aspects of the present technology, as described and illustrated by way of the examples herein. The instructions in some examples include executable code that, when executed by one or more processors, such as the processor(s) 12 or 24, cause the processors to carry out steps necessary to implement the methods of the examples of this technology that are described and illustrated herein.

Figure 4:
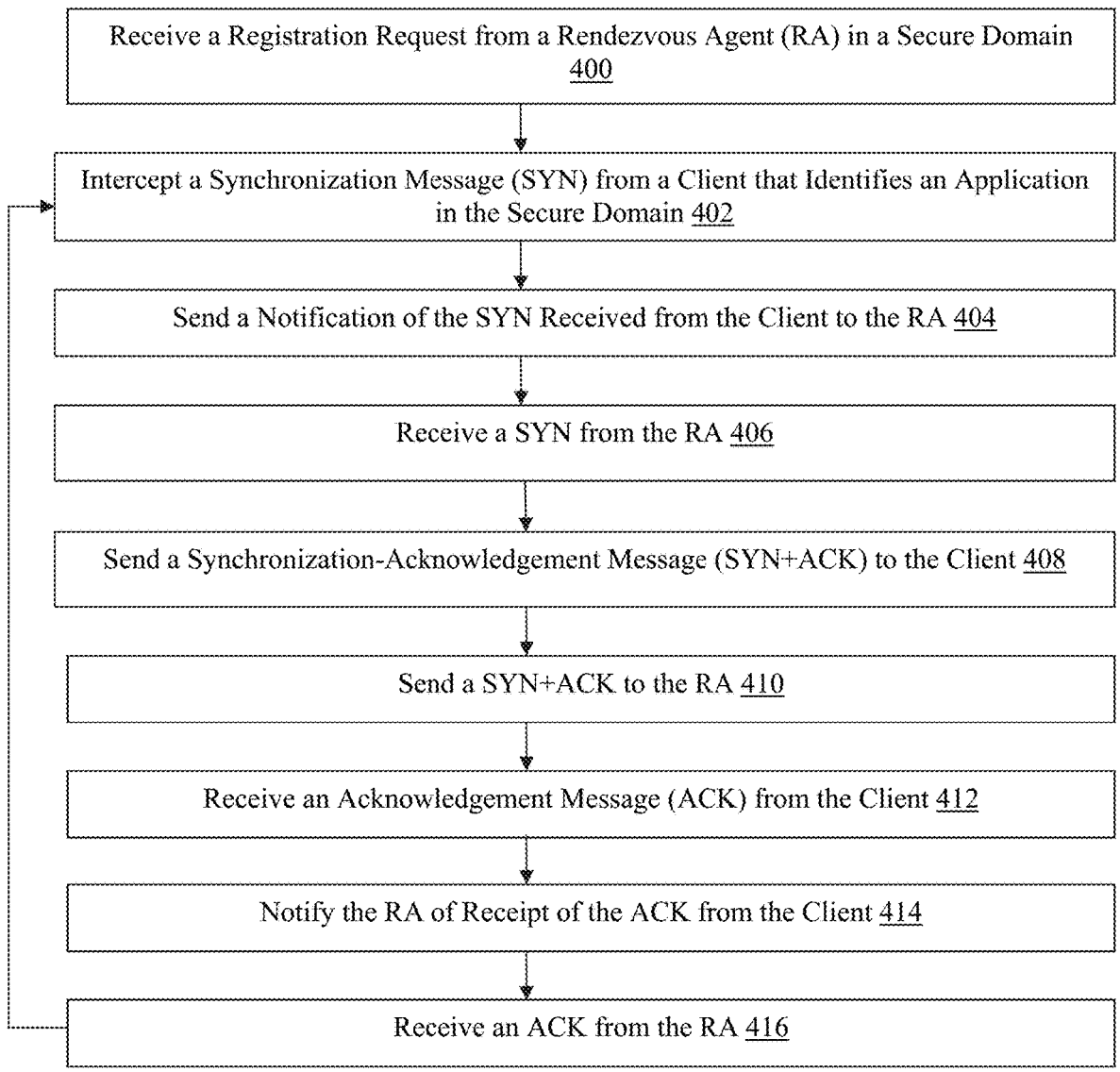
FIG. 4 is a flowchart of an exemplary method for facilitating secure access to services behind a firewall with an RG.

Referring more specifically to FIG. 4, a flowchart of an exemplary method of facilitating secure access to services (e.g., application 91) behind the firewall 40 with the RG 60 is illustrated. In step 400 in this example, the RG 60 of the network security system 10 receives a registration request from the RA 70 in the secure domain 50. In this example, the RG 70 connects, authenticates, or registers the RA 70 and establishes a control connection with the RA 70 in response to the received request. The control connection can be initiated by the RA 70, via the firewall 40, for example, as described and illustrated in more detail later with reference to step 500 of FIG. 5, although other methods of initiating or establishing the control connection can also be used in other examples.

In step 402, the RG 60 intercepts a SYN from the external client 20 that identifies the application 91 in the secure domain 50. In one example, the external client 20 supplies at least one of a special uniform resource identifier (URI) or a special uniform resource locator (URL) that uniquely identifies the application 91 to which the external client 20 wishes to connect. In another example, authentication information for the external client 20 that is sent to the RG 60 may enable the RG 60 to identify a set of firewalled applications (e.g., application 91) with which the external client 20 is authorized to connect. In this example, the RG 60 can facilitate selection by the external client 20 of one of the firewalled applications (e.g., application 91) from a menu or any other selectable feature provided by the RG, for example. Other methods of identifying the application 91 can also be used in other examples.

In step 404, the RG 60 sends a notification of the SYN received from the external client 20 to the RA 70. The notification includes an indication of the application 91 and can be sent via the control connection established in step 400, for example, although other methods of sending the notification can also be used. Sending a SYN as part of a handshake to initiate a TCP connection would be considered an inbound connection request by the firewall 40 and would therefore be blocked. However, the notification of the SYN is not blocked by the firewall 40 in this example.

In step 406, the RG 60 receives a SYN from the RA 70 as part of a TCP handshake to initiate a connection. Accordingly, the RA 70 sends the SYN via the firewall 40 to the RG 60. Since the SYN is an outbound connection request, the firewall 40 does not block the SYN sent from the RA 70 in this example. In response to the notification in step 404, the RA 70 also initiates a TCP connection with the application 91, as described and illustrated in more detail later with reference to FIG. 5.

In step 408, the RG 60 sends a SYN+ACK to the external client 20 in response to the SYN received from the external client 20 in step 402. Accordingly, the RG 60 acknowledges the SYN received from the external client 20 in order to continue the handshake as part of establishing a TCP connection with the external client 20.

In step 410, the RG 60 sends a SYN+ACK to the RA 70 in response to the SYN received from the RA in step 406. In this example, the RG 60 acknowledges the SYN received from the RA 70 in order to continue the handshake as part of establishing a TCP connection with the RA 70. Accordingly, the RG 60 effectively negotiates a separate TCP connection with each of the external client 20 and the RA 70.

In step 412, the RG 60 receives an ACK from the external client 20. Receipt of the ACK from the external client 20 completes the TCP handshake with the external client 20 and establishes the TCP connection with the external client 20. Subsequent to completion of the TCP handshake, the RG 60 and client 20 can optionally initiate a TLS handshake to establish a secure connection between those devices.

In step 414, the RG 60 notifies the RA 70 of receipt of the ACK from the external client in step 412. Because the RG 60 established a TCP connection with the external client 20, based on receipt of the ACK in step 412, the RA 70 can confirm, based on the notification in step 414, that the external client is authenticated and is authorized to access the application 91.

Accordingly, in step 416, the RG 60 receives an ACK from the RA 70. The ACK from the RA 70 effectively completes the TCP connection between the RG 60 and the RA 70. Subsequent to completion of the TCP handshake, the RG 60 and RA 70 can optionally initiate a TLS handshake to establish a secure connection between those devices. Subsequent to receiving the ACK from the RA 70, the RG 60 optionally proceeds back to step 402 and intercepts a SYN from the external client 20 or a different client that is external to (i.e. on the other side of the firewall 40 from) the secure domain 50. In other examples, one or more of steps 402-416 can be performed in a different order or in parallel.

Figure 5:
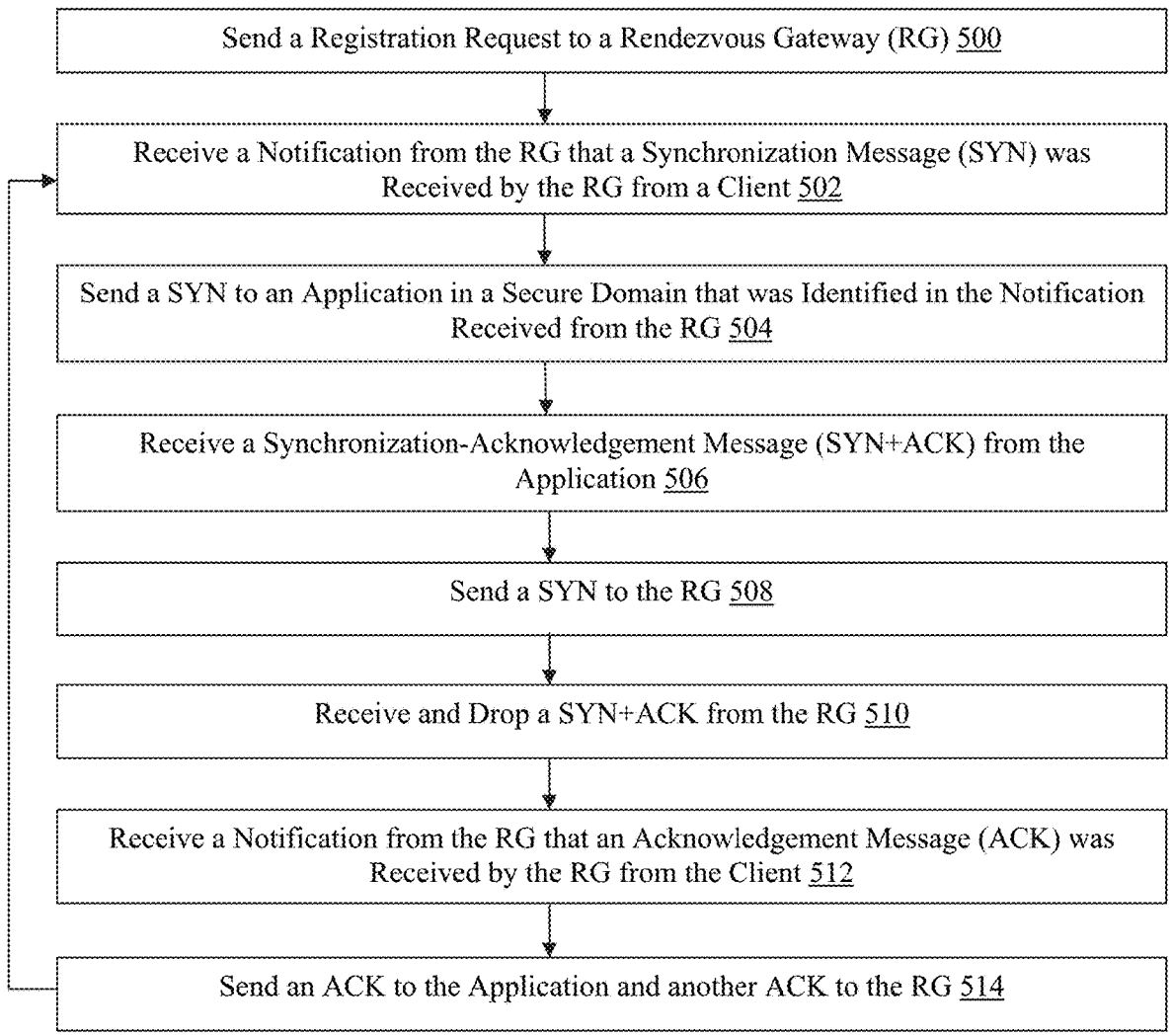
FIG. 5 is a flowchart of an exemplary method for facilitating secure access to services behind a firewall with an RA.

Referring more specifically to FIG. 5, a flowchart of an exemplary method of facilitating secure access, to services (e.g., application 91) behind the firewall 40, with the RA 70 is illustrated. In step 500 in this example, the RA 70 of the network security system 10 sends a registration request to the RG 60 based on a pre-configuration that includes identifying information for the RG 60 or a discovery process, for example. In response to the registration request, the RG 60 authenticates the RA 70, registers the RA 70, or otherwise establishes a control connection with the RA 70, as described and illustrated in more detail earlier with reference to step 400 of FIG. 4.

In one example, the RA 70 can be configured to select the RG 60 from a plurality of RGs (not shown) through an L4 load balancer or a domain name system (DNS) (not shown) based on load balancing techniques, although other methods of selection can also be used. Facilitating RG selection introduces improved scalability and disaggregation of workload into the network security system 10.

By way of example only, the RG selection can be based on a prearranged hash that the RA 70 is configured to use for selecting the RG 70 from a plurality of RGs. In this example, the prearranged hash can also be used to determine the desired RG (e.g., RG 60) to which an initial access request from the external client 20 is to be redirected (e.g., by another RG). Using the prearranged hash is performable by applying at least one HTTP response code, for example, although other methods of using the prearranged hash or selecting the RG 60 can also be used in other examples.

In some examples, the RG 60 has a constant control connection with each of a plurality of RAs (not shown), including RA 70, that the RG 60 supports, and the RAs are configured to transmit information relating to system health, system state, resource usage reports, or a list of applications behind each RA. The transmitted information facilitates determination, by the RG 60, of the number and health state of the available population of applications and other capacity metrics for each application for which external access may be provided.

The control connection between the RG 60 and the RA 70 also permits implementation of a "simultaneous open" mechanism, wherein each device of two devices may open a connection to one another by issuing outgoing SYN, SYN+ACK, and ACK packets that simultaneously pass through a network. When such "simultaneous passage" is performed, a fully bidirectional connection is enabled between the two devices, and each device is effectively the simultaneous initiator of the TCP "simultaneous connection."

The RG 60 can also be configured to force a meeting of the timing requirements for the TCP simultaneous connection via a feature of the RG 60 for sending control commands to the RA 70 and to control the timing and characteristics of the packets that the RA 70 sends between the external client 20 and the application 91. Moreover, the RA 70 can provide any number of policy settings for security or networking parameters that are similar to, or the same as, that of the RG 60 for effecting the connection in some examples. At least some distribution of management and self-determination for these policy settings is optionally effected for the secure domain 50.

In step 502, the RA 70 receives a notification from the RG 60 that a SYN was received by the RG 60 from the external client 20. The notification includes an indication of the application 91 and could have been sent by the RG 60 as described and illustrated in more detail earlier with reference to step 404 of FIG. 4, for example. The notification can also be sent via the control connection established in step 500 and via the firewall 40, for example. Additionally, the SYN could have been received by the RG 60 from the external client 20 as described and illustrated earlier with reference to step 402 of FIG. 4.

In step 504, the RA 70 sends a SYN to the application 91 in the secure domain 50 to initiate a TCP handshake with the application 91. The application 91 was identified in the notification received in step 502. The RA 70 effectively initiates a TCP connection with the application 91 on behalf of the RG 60 and external client 20.

In step 506, the RA 70 receives a SYN+ACK from the application 506 in response to the SYN sent to the application in step 504. In this example, the RA 70 does not respond to the application 91 with an ACK until the RA 70 confirms that the RG 60 has authenticated the external client 20 and establishes a TCP connection with the external client 20, as described and illustrated in more detail with reference to steps 512-514.

In step 508, the RA 70 sends a SYN to the RG 60 in response to the notification from the RG 60 received in step 502. Accordingly, the RA 70 initiates a TCP handshake with the RG 60 that, from the perspective of the firewall 40, is an outbound connection request with respect to the secure domain 50, and is therefore permitted.

In step 510, the RA 70 receives, and optionally drops, a SYN+ACK from the RG 60. Although the RA 70 subsequently acknowledges the SYN+ACK so that the stateful firewall 40 perceives a completed handshake, the SYN+ACK does not need to be maintained by the RA 70. The RG could have been sent by the RG 60 as described and illustrated in more detail earlier with reference to step 410 of FIG. 4, for example.

In step 512, the RA 70 receives a notification from the RG 60 that an ACK was received by the RG 60 from the external client 20. Accordingly, the RG 60 confirms to the RA 70 that the external client 20 is authenticated and that a complete TCP connection has been established with the external client 20. The notification could have been sent by the RG 60 as described and illustrated in more detail earlier with reference to step 414 of FIG. 4.

In step 514, the RA 70 sends an ACK to the application 91 and another ACK to the RG 60. The ACK sent to the application 91 is in response to the SYN+ACK received from the application 91 in step 506. Accordingly, the ACK completes the TCP handshake and establishes a TCP connection with the application 91. The TCP connection with the application 91 is therefore not completed until the RA 70 confirms that the external client 20 has been authenticated by the RG 60 based on the notification received in step 512. The ACK sent to the RG 60 completes the TCP handshake with the RG 60 from the perspective of the firewall 40.

Subsequent to sending the ACKs to the application 91 and RG 60, the RA 70 optionally proceeds back to step 502 an receives a notification from the RG 60, or a different RG, that a SYN was received from the external client 20 or a different external client. In other examples, one or more of steps 502-514 can be performed in a different order or in parallel.

Figure 6:
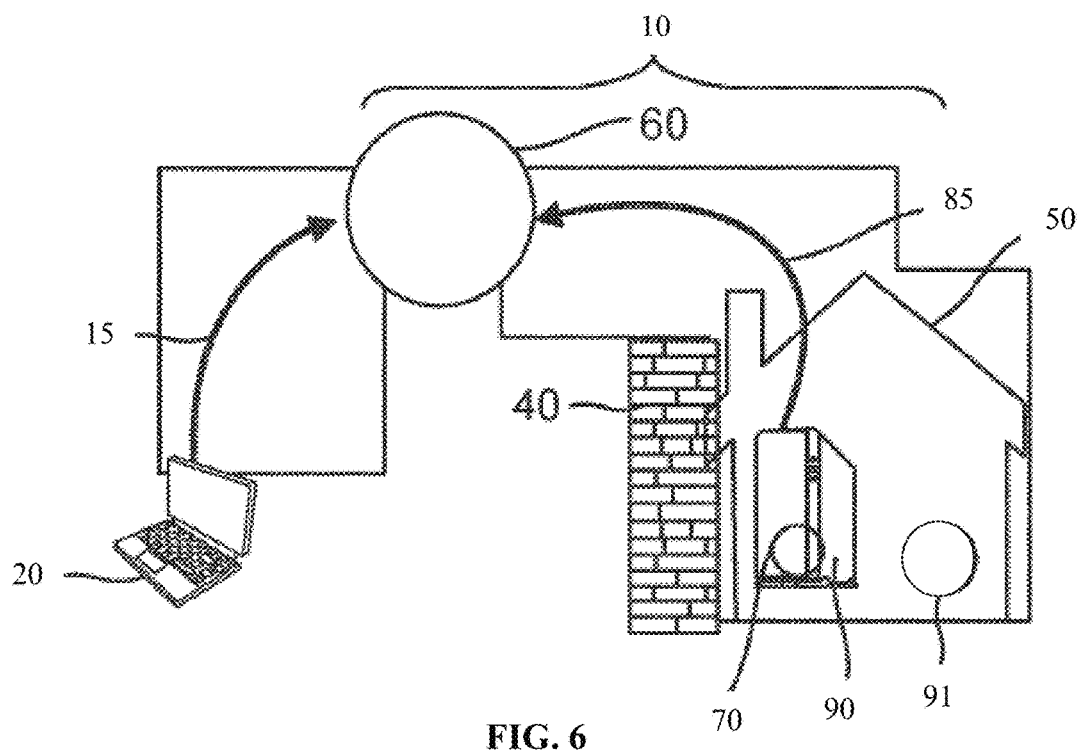
FIGS. 6-14 are flow diagrams of an exemplary method for providing secure access to services behind a firewall.

Referring more specifically to FIGS. 6-14, flow diagrams of an exemplary method for providing secure access to services (e.g., application 91) behind the firewall 40 are illustrated. Referring more specifically to FIG. 6, the network security system 10 in which the RG 60 and the RA 70 are configured to communicate with one another through a trusted connection 85 is illustrated.

Secure access 15 to the firewalled application 91, which can be an IoT service in a secure domain 50 within a home, for example, is provided to an authenticated external client 20 in this example. Optionally, a home gateway device 90 hosts the RA 70 as an application. The RA 70 securely authenticates with the RG 60 by announcing its presence and providing authentication credentials. Once trust is established, secure access to unmodified TCP-based IoT services that are residing within the secure domain. 50 can be provided to an authenticated external client 20. Software for the authenticated external client 20 is also advantageously unmodified and no additional software is required for the authenticated external client 20.

Figure 7:
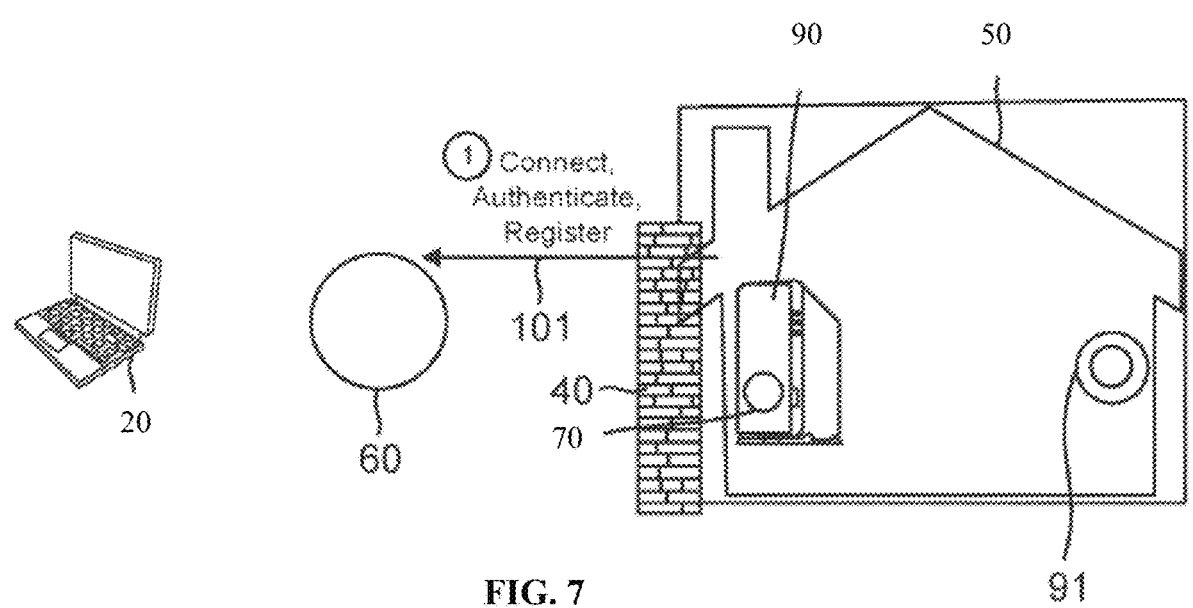

Referring more specifically to FIG. 7, the RA 70 performs at least one of connecting, authenticating, or registering with the RG 60 through a control connection 101, e.g., in a first step. The RA 70, running on the home gateway device 90, registers with the RG 60 configured to provide a service to make home services, such as an application 91, available to an authenticated external client 20.

Figure 8:
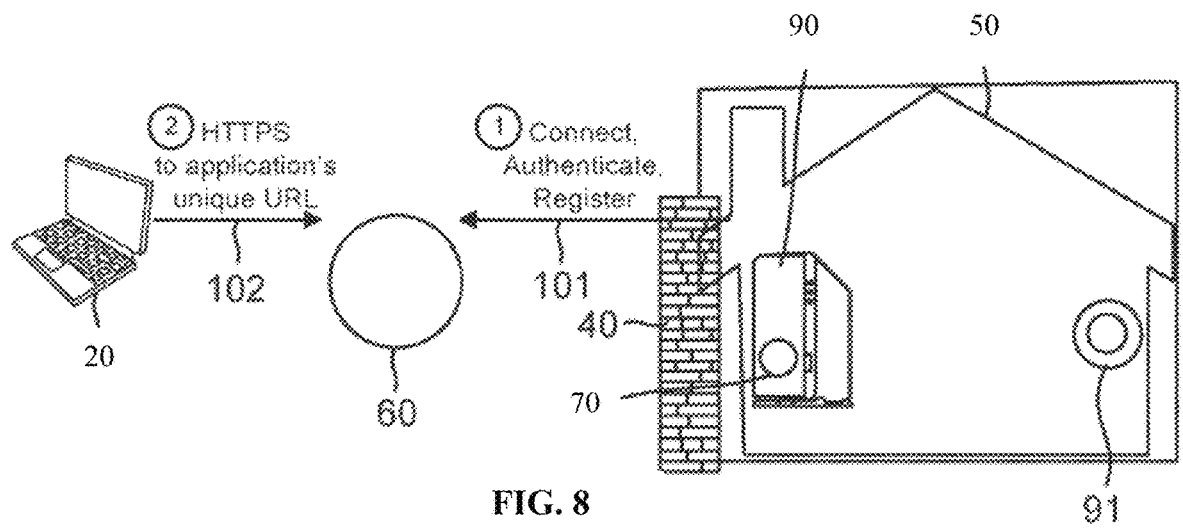

Referring more specifically to FIG. 8, the unsecure external client 20 transmits an HTTPS request, in a second step, that corresponds to a unique home IoT URL associated with the application 91, to the RG 60 through a connection 102. In this example, the HTTPS request includes a TLS server name indication (SNI).

Figure 9:
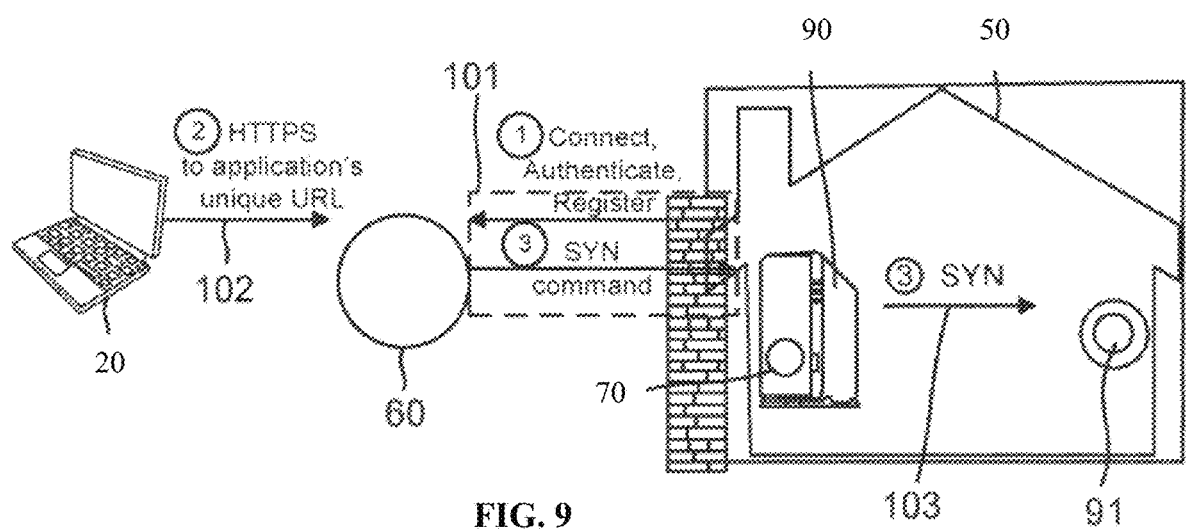

Referring more specifically to FIG. 9, the RG 60 transmits a command or notification, indicating a SYN from the external client 20, to the RA 70 via the control connection 101 in a third step. Additionally, the RA 70 generates a SYN, indicating the client SYN, to the application 91 via a connection 103.

Figure 10:
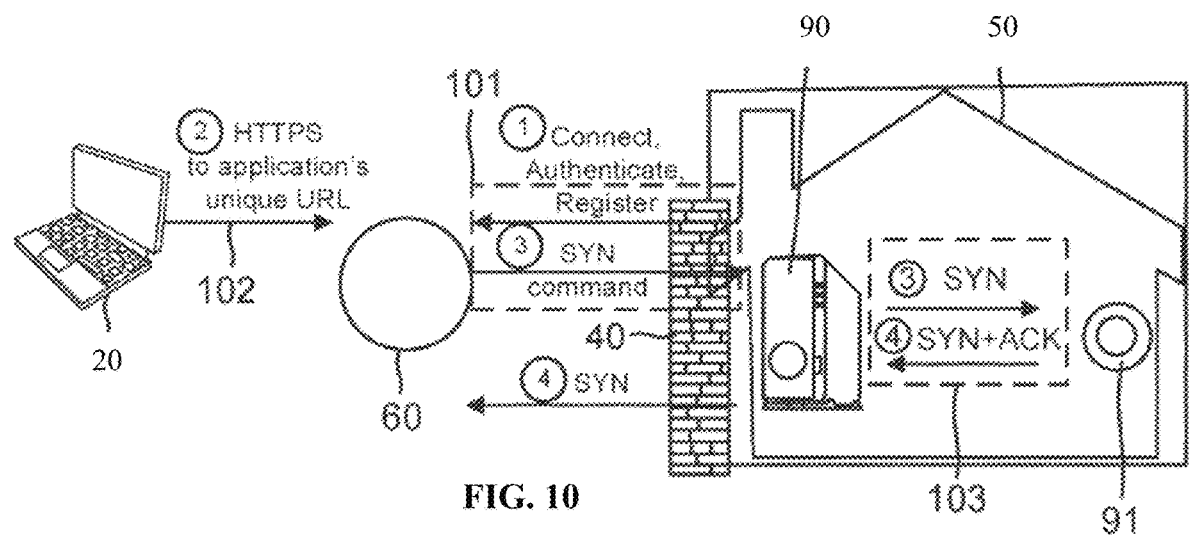

Referring more specifically to FIG. 10, the application 91 responds by transmitting a SYN+ACK to the RA 70 in a fourth step. The RA 70 then converts the SYN+ACK into a SYN and transmits the SYN to the RG 60. The RG 60 and the firewall 40 advantageously perceive a "new" TCP connection based on the SYN from the RA 70, and the connection is outbound from the secure domain 50 and therefore permitted by the firewall 40.

Figure 11:
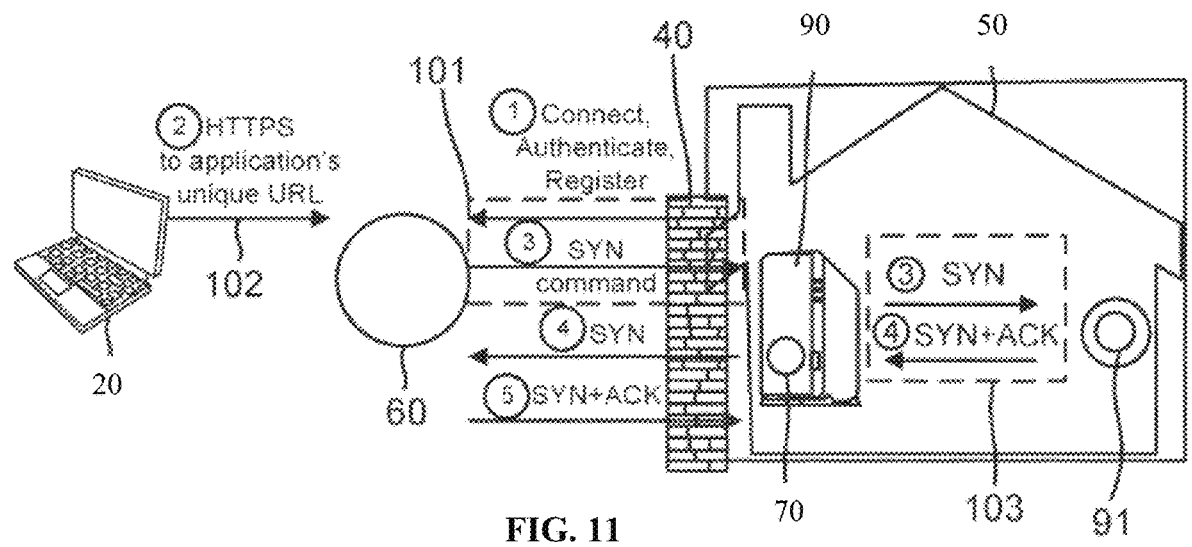

Referring more specifically to FIG. 11, the RG 60 responds to the SYN sent by the RA 70 by transmitting a SYN+ACK to the RA 70 in a fifth step. The RA 70 drops the SYN+ACK in this example. However, the stateful firewall 40 perceives a complete TCP "handshake" and connection, subsequent to the RA 70 acknowledging the SYN+ACK in an eighth step.

Figure 12:
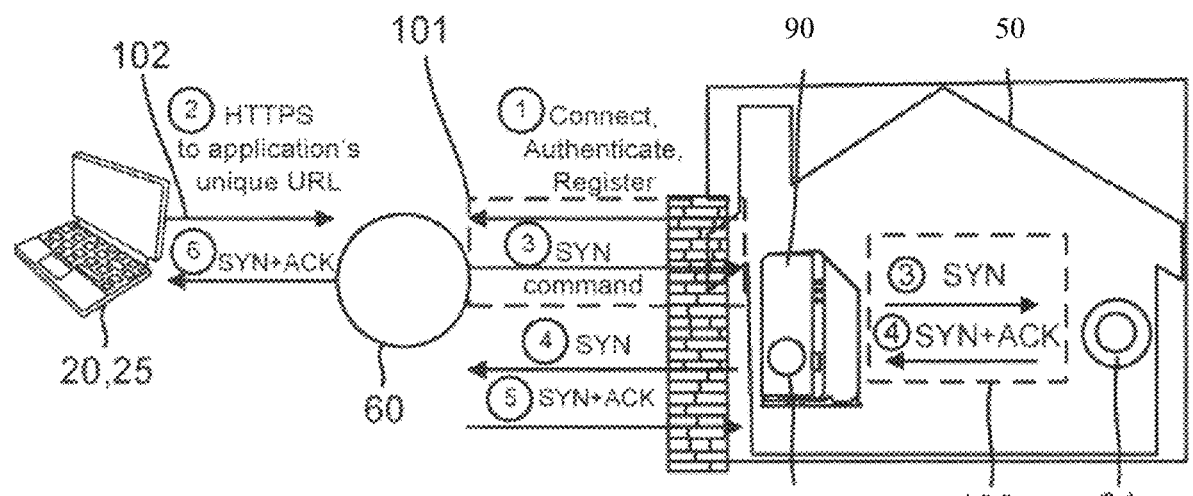

Referring more specifically to FIG. 12, the RG 60 transmits a SYN+ACK to the unsecure external client 20 in a sixth step to acknowledge the SYN sent from the external client 20 in the second step (FIG. 8). The RG 60 can also authenticate a user of the external client 20 by performing an authentication, authorization, and accounting (AAA) process, for example, or any other type of authentication, prior to sending the SYN+ACK. If the external client 20 is not authenticated, then the SYN from the external client 20 is dropped and the process ends.

Figure 13:
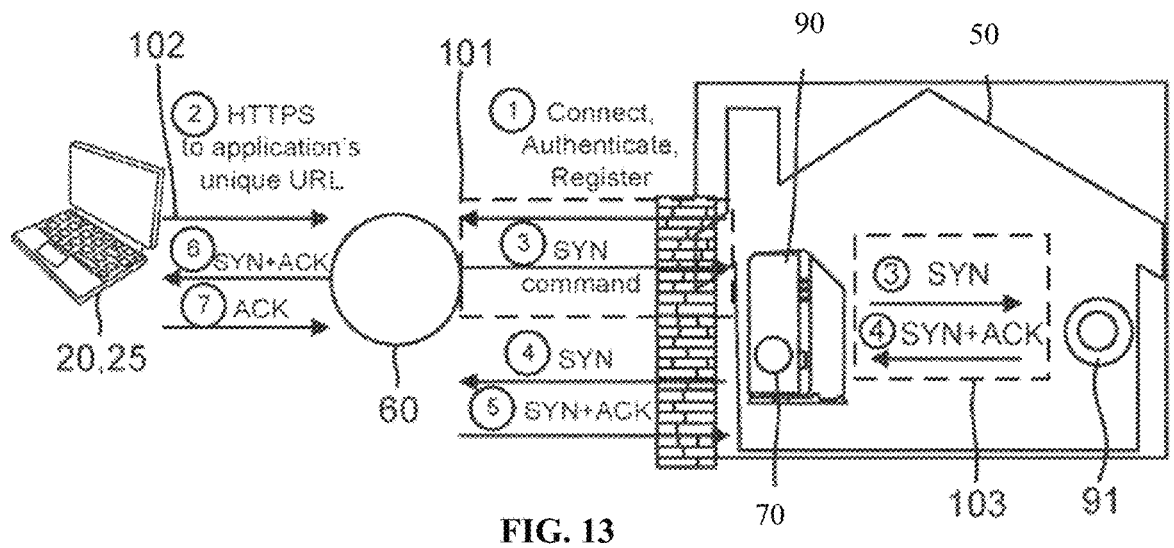

Otherwise, referring more specifically to FIG. 13, the unsecure external client 20 transmits an ACK to the RG 60 in a seventh step. The TCP connection opening handshake with the RG 60 is then completed. At this stage, the user of the external client 20 is now regarded as authenticated.

Figure 14:
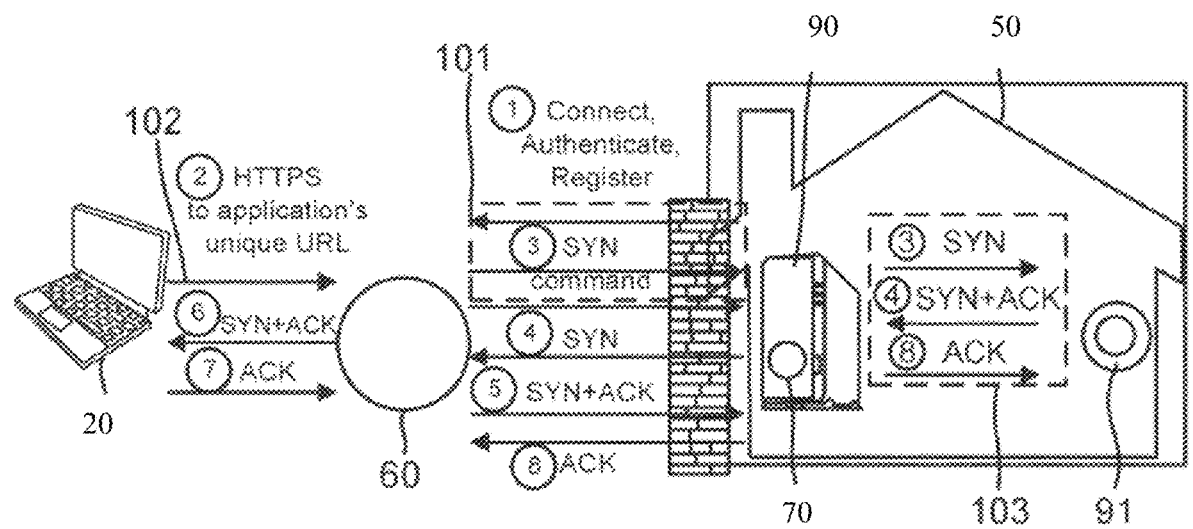

Referring more specifically to FIG. 14, the RG 60 then notifies the RA 70, through the control connection 101, of the ACK received from the external client 20 in an eighth step. The RA 70 then transmits an ACK back to the RG 60, completing a connection and the RA 70 transmits another ACK to the application 91, thereby completing a full connection wherein the authenticated external client 20 and the application 91 are enabled to communicate.

Once the foregoing complete data connections are established, the RG 60 transmits, by proxy, TCP segment data in both directions through the two complete data connections. Optionally, if establishment of the foregoing complete data connections is carefully performed, wherein both sides of the firewall 40 have the same maximum segment size (MSS), the RG may transmit, by proxy, the TCP segment data on a packet-by-packet basis with nearly zero buffering or zero state. With this optional feature, a TCP sequence number offset in either direction of each complete data connection, and a network address translation of the IP addresses and port numbers from one side of the RG 60/RA 70 to the other side of the RG 60/RA 70, can be used in a manner performable by an L4 load balancer, for example.

In some examples, the TCP connection may be fully proxied, wherein the RG 60 terminates the TCP protocol on either side of the RG 60/RA 70 and copies TCP segment data between the two data connections at the TCP protocol level, rather than the packet level. In these examples, a fully proxied TCP connection may be implemented if one side of the TCP connection is encrypted, the other side of the RG 60/RA 70 is encrypted, both sides of the RG 60/RA 70 are encrypted but using different keys, or the MSS is different on each side of the RG 60/RA 70.

Figure 15:
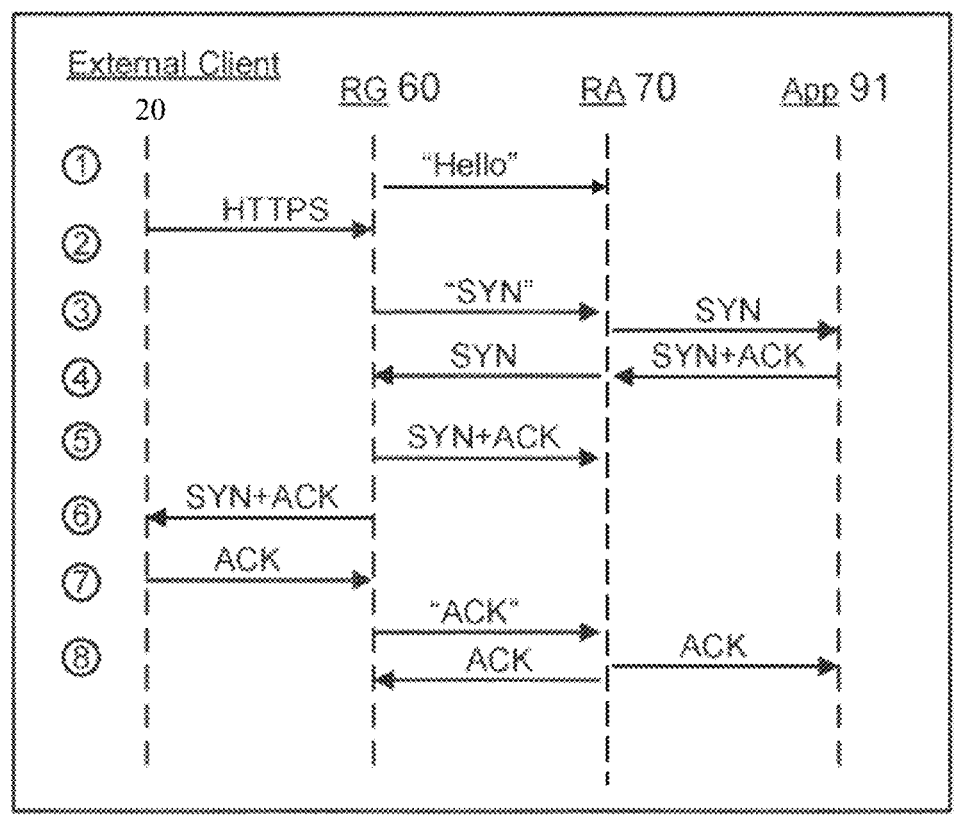
FIG. 15 is a timing diagram of an exemplary method for providing secure access to services behind a firewall.

Referring more specifically to FIG. 15, a timing diagram of an exemplary method for providing secure access to services (e.g., application 91) behind the firewall 40 is illustrated. The step numbers indicated in FIG. 15 correspond to those described and illustrated in more detail earlier with reference to FIGS. 7-14. Accordingly, in a first step, the RG 60 sends a "Hello" message in this example to the RA 70 to initiate establishment of a control connection, although other methods of establishing a control connection can also be used in other examples.

In a second step, the external client 20 initiates an HTTPS request (also referred to herein as a client SYN), which is intercepted by the RG 60. The HTTPS request identifies the application 91, such as in an SNI TLS extension, for example.

In a third step, the RG 60 sends a "SYN" or notification of receipt of the HTTPS request from the external client 20. The RA 70 subsequently sends a SYN to the application 91 to initiate a TCP handshake and connection with the application 91. In response, the application 91 sends a SYN+ACK.

In a fourth step, the RA 70 sends a SYN to the RG 60 based on the SYn+ACK from the application 91. The SYN is sent by the RA 70 in order to initiate a TCP handshake from the perspective of a firewall disposed between the RG 60 and RA 70 (not shown in FIG. 15), which only allows connections that are outbound from a secure domain 50 in which the RA 70 and application 91 are disposed.

In a fifth step, the RG 60 sends a SYN+ACK to the RA 70 in response to the SYN sent by the RA 70 to the RG 60 in the fifth step. The SYN+ACK is sent via a firewall as part of a TCP handshake observed by the firewall for an allowed outbound connection.

Additionally, in a sixth step, the RG 60 sends a SYN+ACK to the external client 20 in response to the HTTPS request received by the RG 60 in the second step. Optionally, the RG 60 authenticates a user of the external client 20 prior to sending the SYN+ACK.

In a seventh step, the external client 20 sends an ACK to the RG 60 to complete the TCP connection with the RG 60. The external client 20 is now considered authenticated.

Accordingly, in an eighth step, the RG 60 sends an "ACK" or notification to the RA 70 that the ACK was received from the external client 20 in the seventh step, which indicates to the RA 70 that the external client 20 was authenticated. Following receipt of the notification, the RA 70 sends an ACK to the application 91 to complete the TCP connection with the application 91, as well as another ACK to the RG 60 to complete the TCP connection with the RG 60 from a perspective of the firewall disposed between the RG 60 and RA 70.

Accordingly, as described and illustrated by way of the examples herein, the firewall 40, protecting the secure domain 50, perceives only an outgoing connection from the RA 70 to establish the control connection with the RG 60, and an outgoing connection from the application 91 behind the firewalled secure domain 50 toward the RG 60. The conditions that the firewall 40 typically enforces for providing security, e.g., only allowing an outgoing connection, are completely satisfied by the examples of this technology, notwithstanding that the external client 20 is effectively provided with a connection to a service (i.e., application 91) residing behind the firewalled secure domain 50.

Therefore, this technology advantageously allows clients external to a secure domain behind a firewall to access services or applications within the secure domain. By using an external RG to prompt an RA, which is internal to a secure domain and behind a firewall, to initiate a connection with the RG, this technology facilitates access to services within the secure domain by an external client while complying with security requirements of the firewall. Accordingly, this technology extends firewalls and facilitates improved scalability of firewalls. This technology also improves the security of services and applications in firewalled, secure domains, including those associated with IoT devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for secure access to services behind a firewall implemented in cooperation with a network security system comprising one or more rendezvous gateway (RG) modules, rendezvous agent (RA) modules, firewall modules, host modules, or client modules, the method comprising:
   sending an RG synchronization message (SYN) to an application in a secure domain following receipt, from a client, of a client SYN comprising an indication of the application;
   receiving, via a firewall coupled to the security domain and in response to the RG SYN, an RA SYN from an RA in the secure domain;
   sending a first RG synchronization-acknowledgement message (SYN+ACK) to the client in response to the client SYN and, via the firewall, a second RG SYN+ACK to the RA in response to the RA SYN;
   notifying the RA of receipt of a client acknowledgement message (ACK) from the client and receiving an RA ACK from the RA and via the firewall in response to the notification, to thereby establish a full connection between the client and the application.

2. The method of claim 1, further comprising connecting, authenticating, or registering the RA via a control connection prior to receiving the RA SYN from the RA, wherein the RG SYN comprises a notification of receipt of the client SYN and is sent via the control connection.

3. The method of claim 1, wherein the indication of the application comprises a uniform resource locator (URL) or uniform resource identifier (URI) or is included in a server name indication (SM) transport layer security (TLS) extension of the client SYN.

4. The method of claim 3, wherein the client SYN comprises a hypertext transfer protocol secure (HTTPS) request.

5. The method of claim 1, further comprising authenticating a user of the client prior to sending the first SYN+ACK to the client in response to the client SYN.

6. A rendezvous gateway (RG) apparatus, comprising memory comprising programmed instructions stored thereon and one or more processors configured to be capable of executing the stored programmed instructions to:
send an RG synchronization message (SYN) to an application in a secure domain following receipt, from a client, of a client SYN comprising an indication of the application;
receive, via a firewall coupled to the security domain and in response to the RG SYN, an RA SYN from an RA in the secure domain;
send a first RG synchronization-acknowledgement message (SYN+ACK) to the client in response to the client SYN and, via the firewall, a second RG SYN+ACK to the RA in response to the RA SYN;
notify the RA of receipt of a client acknowledgement message (ACK) from the client and receiving an RA ACK from the RA and via the firewall in response to the notification, to thereby establish a full connection between the client and the application.

7. The RG apparatus of claim 6, wherein the processors are further configured to be capable of executing the stored programmed instructions to connect, authenticate, or register the RA via a control connection prior to receiving the RA SYN from the RA, wherein the RG SYN comprises a notification of receipt of the client SYN and is sent via the control connection.

8. The RG apparatus of claim 6, wherein the indication of the application comprises a uniform resource locator (URL) or uniform resource identifier (URI) or is included in a server name indication (SM) transport layer security (TLS) extension of the client SYN.

9. The RG apparatus of claim 8, wherein the client SYN comprises a hypertext transfer protocol secure (HTTPS) request.

10. The RG apparatus of claim 6, wherein the processors are further configured to be capable of executing the stored programmed instructions to authenticate a user of the client prior to sending the first SYN+ACK to the client in response to the client SYN.

11. A non-transitory computer readable medium having stored thereon instructions for secure access to services behind a firewall comprising executable code that, when executed by one or more processors, causes the processors to:
send an RG synchronization message (SYN) to an application in a secure domain following receipt, from a client, of a client SYN comprising an indication of the application;
receive, via a firewall coupled to the security domain and in response to the RG SYN, an RA SYN from an RA in the secure domain;
send a first RG synchronization-acknowledgement message (SYN+ACK) to the client in response to the client SYN and, via the firewall, a second RG SYN+ACK to the RA in response to the RA SYN;
notify the RA of receipt of a client acknowledgement message (ACK) from the client and receiving an RA ACK from the RA and via the firewall in response to the notification, to thereby establish a full connection between the client and the application.

12. The non-transitory computer readable medium of claim 11, wherein the executable code, when executed by the processors further causes the processors to connect, authenticate, or register the RA via a control connection prior to receiving the RA SYN from the RA, wherein the RG SYN comprises a notification of receipt of the client SYN and is sent via the control connection.

13. The non-transitory computer readable medium of claim 11, wherein the indication of the application comprises a uniform resource locator (URL) or uniform resource identifier (URI) or is included in a server name indication (SNI) transport layer security (TLS) extension of the client SYN.

14. The non-transitory computer readable medium of claim 13, wherein the client SYN comprises a hypertext transfer protocol secure (HTTPS) request.

15. The non-transitory computer readable medium of claim 11, wherein the executable code, when executed by the processors further causes the processors to authenticate a user of the client prior to sending the first SYN+ACK to the client in response to the client SYN.

16. A network security system, comprising one or more rendezvous gateway (RG) modules, rendezvous agent (RA) modules, firewall modules, host modules, or client modules, memory comprising programmed instructions stored thereon, and one or more processors configured to be capable of executing the stored programmed instructions to:
send an RG synchronization message (SYN) to an application in a secure domain following receipt, from a client, of a client SYN comprising an indication of the application;
receive, via a firewall coupled to the security domain and in response to the RG SYN, an RA SYN from an RA in the secure domain;
send a first RG synchronization-acknowledgement message (SYN+ACK) to the client in response to the client SYN and, via the firewall, a second RG SYN+ACK to the RA in response to the RA SYN;
notify the RA of receipt of a client acknowledgement message (ACK) from the client and receiving an RA ACK from the RA and via the firewall in response to the notification, to thereby establish a full connection between the client and the application.

17. The network security system of claim 16, wherein the processors are further configured to be capable of executing the stored programmed instructions to connect, authenticate, or register the RA via a control connection prior to receiving the RA SYN from the RA, wherein the RG SYN comprises a notification of receipt of the client SYN and is sent via the control connection.

18. The network security system of claim 16, wherein the indication of the application comprises a uniform resource locator (URL) or uniform resource identifier (URI) or is included in a server name indication (SNI) transport layer security (TLS) extension of the client SYN.

19. The network security system of claim 18, wherein the client SYN comprises a hypertext transfer protocol secure (HTTPS) request.

20. The network security system of claim 16, wherein the processors are further configured to be capable of executing the stored programmed instructions to authenticate a user of the client prior to sending the first SYN+ACK to the client in response to the client SYN.

* * * * *